Figure 1:
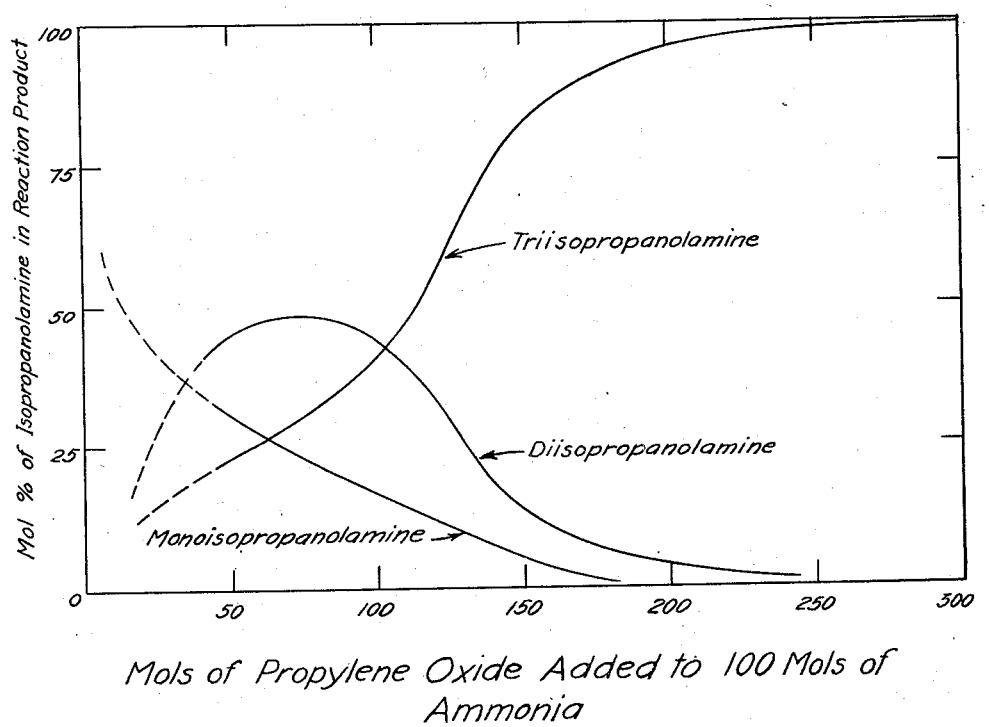

Jan. 15, 1935.   J. N. WICKERT   1,988,225
HYDROXYALKYLAMINES
Filed Jan. 16, 1932   2 Sheets-Sheet 1

Mols of Propylene Oxide Added to 100 Mols of Ammonia

Jan. 15, 1935. J. N. WICKERT 1,988,225
HYDROXYALKYLAMINES
Filed Jan. 16, 1932 2 Sheets-Sheet 2

INVENTOR:
Jacob N. Wickert,
BY Byrnes, Townsend & Potter,
ATTORNEYS

UNITED STATES PATENT OFFICE 1,988,225

HYDROXYALKYLAMINES

Jacob N. Wickert, South Charleston, W. Va., assignor to Carbide and Carbon Chemicals Corporation, a corporation of New York Application January 16, 1932, Serial No. 587,040

6 Claims. (Cl. 260—127)

Numerous investigators have disclosed experimental data on the condensation of ethylene oxide with ammonia to form a mixture of the ethanolamines, but the prior art discloses little information concerning the behavior of the higher alkylene oxides with ammonia. The present invention has as its chief object the disclosure of the heretofore undescribed isopropanolamines and the conditions under which they are preferably to be formed from propylene oxide and ammonia.

A detailed experimental investigation has led to the discovery of heretofore unknown facts concerning the preparation and properties of the isopropanolamines of the formula $(C_3H_7O)_n NH_x$, where $n$ equals 1, 2 or 3, and $x$ equals 3 minus $n$.

One, two or three molecules of propylene oxide may react with one molecule of ammonia, as follows:

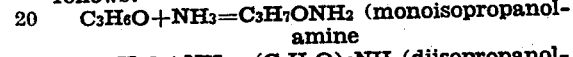 (monoisopropanolamine)

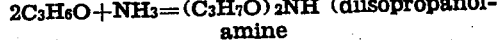 (diisopropanolamine)

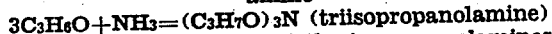 (triisopropanolamine)

The hydroxyl groups of the isopropanolamines so formed tend to react to form heavier and more complex compounds. I have found that this tendency is greater at higher temperatures, so it is desirable to keep the reacting mixture at or below about 55° C. Furthermore, since the reactions between ammonia and propylene oxide are exothermic, it is necessary to cool the reacting mixture in order to prevent an undesirable rise in temperature of the reaction mixture.

I have further found that it is desirable to avoid an excess of unreacted propylene oxide in the mixture, for if an excess of unreacted oxide is present, the reaction will proceed with dangerous violence. A suitable method of preventing the accumulation of such an excess is to distribute the oxide gas as very fine bubbles in the ammonia liquid, as by diffusing the gas through a porous ceramic article which is immersed in the liquid. The rate of diffusion of the gas through the porous article may easily be controlled by regulating the gas pressure.

My experiments have led to the discovery of the relative proportions of the three isophopanolamines which are obtained in the product when various amounts of propylene oxide are added to a certain amount of ammonia. The mol percent of each of the amines obtained in the reaction mixture by adding various amounts of propylene oxide to one hundred mols of ammonia is shown in Table A.

Table A

| Mols of $C_3H_6O$ per 100 mols of $NH_3$ | Mol. percent of amine in product— | | |
|---|---|---|---|
| | Mono- | Di- | Tri- |
| 300 | 0 | 0 | 100 |
| 200 | 0 | 4 | 96 |
| 150 | 5 | 12 | 83 |
| 100 | 17 | 44 | 39 |
| 50 | 30 | 46 | 23 |

From the curves shown in Figure 1 of the accompanying drawings a somewhat clearer understanding may be obtained of these relationships of the reactants and the three products. The curves of Figure 1 were constructed by drawing smooth curves through the points obtained by plotting the values given in Table A on suitable coordinates. From these it is seen that it is possible to secure a product comprising substantially all monoisopropanolamine or substantially all triisopropanolamine, or equal proportions of any two of the amines, by control of the relative concentrations of the reactants. For example, a product containing more than about 90% of triisopropanolamine may be made if the total quantity of propylene oxide added is more than about 80% of the amount required by the equation $3C_3H_6O + NH_3 \rightarrow (C_3H_7O)_3N$.

I have determined some of the physical properties of the three pure isopropanolamines, and in Table B they are compared with the corresponding properties of the ethanolamines.

Table B

| | Specific gravity 20°/20° C. | Boiling point at 5 mm. | Freezing point °C. | Alkalinity pH |
|---|---|---|---|---|
| | | °C. | | |
| Monoisopropanolamine | 0.981 | 45 | —5 | 11.4 |
| Diisopropanolamine | 1.0089 | 116 | 32 | 11.1 |
| Triisopropanolamine | 1.0196 | 144 | 45 | 11.2 |
| Monoethanolamine | 1.0180 | 58 | 10.5 | 11.50 |
| Diethanolamine | 1.0984 | 156 | 28.0 | 11.75 |
| Triethanolamine | 1.1258 | 201 | 21.2 | 11.30 |

Figure 2:
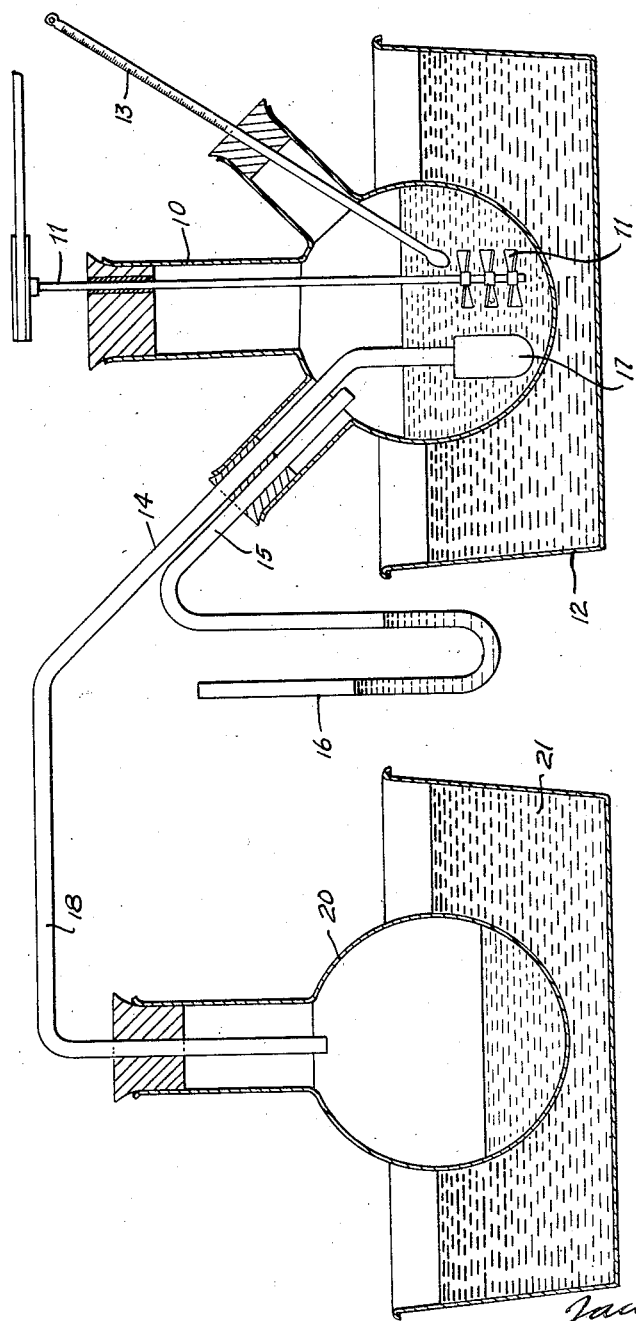

My experimental method is indicated by the following example, wherein specific reference is made to the apparatus shown diagrammatically in Figure 2 of the accompanying drawings. A flask 10 was equipped with a mechanical stirrer 11 and mounted in a water bath 12 having cold water circulation means. Into a side neck of the flask 10 was mounted a thermometer 13, and into another side neck were fitted an inlet tube 14 reaching to the bottom of the flask 10 and an outlet tube 15, which was connected to a manometer 16. On the bottom of the inlet tube 14 was a porous diffuser 17 consisting of a closed-end porous ceramic cylinder. Another flask 20 served as a propylene oxide vaporizer, and was connected through a tube 18 to the inlet tube 14 of the reaction flask. The vaporizer flask was heated by a water bath 21 and its temperature so regulated that the propylene oxide vapors would be diffused into the ammonia about as fast as they were used up in the reaction.

Concentrated aqua ammonia (28% $NH_3$) was placed in the reaction flask 10 and the stirrer 11 was started. The propylene oxide was bubbled as a vapor into this solution. When the heat of the reaction had raised the temperature to 45° C., the cooling water was started circulating through the bath 12 slowly and the temperature of the reacting liquid was held between 45° C. and 55° C. for the rest of the experiment. The rate of addition of propylene oxide vapor was regulated by the pressure on the system as registered on the manometer 16. The pressure was kept at amospheric until the reaction was well started and later was kept slightly less than atmospheric by the absorption of propylene oxide from the vapors in the flask 10. After all the propylene oxide had been added, the system was allowed to stand with the stirrer 11 running for about a half hour, during which time the temperature in flask 10 slowly dropped to that of the room. The product was then stored in a stoppered flask until it could be distilled.

The distillation of the product was carried out in two steps. The water and unreacted material were distilled off under about 20 inches vacuum and at 65–70° C. This distillate was analyzed for organic amines and in no case showed more than a trace. The residue was then distilled at 5 mm. according to common procedure, using oil heating. The lowest-boiling fraction started distilling at 65° C. but the temperature soon settled to 45° C. as the monoisopropanolamine was distilled out. The next fraction distilled at 116° C. to give a clear waterwhite liquid of rather high viscosity that soon solidified to a colorless crystalline mass. This was the diamine. The triisopropanolamine distilled slowly at 145° C. and gave a heavy, slightly yellow oil that soon solidified to colorless crystals. Each fraction distilled over at a very sharply defined temperature, and practically no material distilled at temperatures between those given above. The residue after removal of the triisopropanolamine was very small, and had about the same equivalent weight as the triamine. Each fraction was examined for specific gravity, equivalent weight, freezing point, and alkalinity by standard methods.

I claim:

1. The method of producing a mixture of isopropanolamines containing more than about 90% of triisopropanolamine which comprises adding propylene oxide to an aqueous solution of ammonia in such amount that the propylene oxide so added is more than about 80% of the amount required by the equation $$3C_3H_6O + NH_3 \rightarrow (C_3H_7O)_3N.$$

2. The method as claimed in claim 1 in which the temperature is maintained below about 55° C.

3. The method of producing isopropanolamines which comprises gradually diffusing propylene oxide into an aqueous solution of ammonia, the total quantity of propylene oxide added being not greater than the amount required by the equation $3C_3H_6O + NH_3 \rightarrow (C_3H_7O)_3N$, while maintaining the temperature of said solution below about 55° C.

4. As a chemical compound, a polyisopropanolamine of the formula $(C_3H_7O)_nNH_x$, where $n$ equals 2 or 3, and $x$ equals 3 minus $n$.

5. As a chemical compound, diisopropanolamine, $(C_3H_7O)_2NH$, which boils at about 116° C. under an absolute pressure of about 5 mm. of mercury, and which freezes at about 32° C.

6. As a chemical compound, triisopropanolamine, $(C_3H_7O)_3N$, which boils at about 144° C. under an absolute pressure of about 5 mm. of mercury, and which freezes at about 45° C.

JACOB N. WICKERT.